US006697380B1

United States Patent
Egbert et al.

(10) Patent No.: US 6,697,380 B1
(45) Date of Patent: Feb. 24, 2004

(54) MULTIPLE KEY LOOKUP ARRANGEMENT FOR A SHARED SWITCHING LOGIC ADDRESS TABLE IN A NETWORK SWITCH

(75) Inventors: Chandan Egbert, San Jose, CA (US); Mrudula Kanuri, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/502,571

(22) Filed: Feb. 11, 2000

Related U.S. Application Data

(60) Provisional application No. 60/169,297, filed on Dec. 7, 1999.

(51) Int. Cl.[7] .............................................. H04L 12/56
(52) U.S. Cl. ...................................... 370/469; 370/412
(58) Field of Search ................................. 370/393, 411, 370/395.5, 469, 389, 395.7, 412

(56) References Cited

U.S. PATENT DOCUMENTS 5,432,907 A * 7/1995 Picazo, Jr. et al.
5,936,966 A * 8/1999 Ogawa et al.
5,953,335 A   9/1999 Erimli et al.
6,044,087 A * 3/2000 Muller et al.
6,049,528 A * 4/2000 Hendel et al.
6,192,051 B1 * 2/2001 Lipman et al.
6,424,659 B2 * 7/2002 Viswanadham et al.
6,430,188 B1 * 8/2002 Kadambi et al.
6,535,509 B2 * 3/2003 Amicangioli

* cited by examiner

Primary Examiner—Chi Pham
Assistant Examiner—Derrick W. Ferris
(74) Attorney, Agent, or Firm—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a switching module having a shared address table storing address entries for both layer 2 and layer 3 address search operations for layer 2 and layer 3 processing. The shared address table is configured for storing in each address entry two key entries, and two pointer fields, enabling each address entry of the shared address table to logically belong to two separate and independent tables for search purposes.

11 Claims, 4 Drawing Sheets

MULTIPLE KEY LOOKUP ARRANGEMENT FOR A SHARED SWITCHING LOGIC ADDRESS TABLE IN A NETWORK SWITCH

This application claims priority from Provisional Application No. 60/169,297, filed Dec. 7, 1999.

BACKGROUND OF THE INVENTION

1. Field of the Invention

The present invention relates to layer 2 and layer 3 switching of data packets in a nonlocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1 q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, switching fabrics in layer 2 switches merely need to determine an output port for an incoming layer 2 data packet. Hence, conventional layer 2 switches can perform an address table lookup for switching information merely by searching the address table using a MAC address as a key. For example, a hash function may be performed on a 48-bit MAC address to generate a hash key having a less number of bits, for example, 4 bits. The hash key is then used for accessing an address table configured for storing bin entries and heap entries.

FIG. 1 is a diagram illustrating an address table 100 storing bin entries 102 and heap entries 104. The bin entries serve as an index for a range of heap entries 104, where the heap entries 104 assigned to a given bin entry (e.g., 102) have the same hash key generated for the respective MAC addresses. Each heap entry 104 includes a MAC address field 105, a switching information field 106 that includes switching information for the corresponding MAC address field 105, and a next entry field 108 that specifies the next heap entry 104 belonging to the corresponding bin entry 102, effectively forming a linked list of heap entries 104 for each of the bin entries 102. If the hash key is a 4-bit value, then the address table 102 would include up to sixteen bin entries 102 that could be addressable by the corresponding hash key value. Hence, a switching logic generates a hash key from a MAC address, identifies one of the bin entries based on the hash key, and performs a sequential search of the heap entries 104 belonging to be identified bin entry for the appropriate MAC address. Use of the bin entries 102 for searching of the heap entries 104 provides the advantage of reduced search times, since only the heap entries 104 belonging to a given bin entry 102 need to be searched, as opposed to searching the entire address table 100 as a linked list for a given MAC address.

Layer 3 processing, however, requires not only searching of layer 3 switching information based on an Internet Protocol (IP) address, but also may require additional processing to associate a MAC address to an IP address. Hence, the address table 100 of FIG. 1 and the stored switching information 106 would need to be duplicated for IP address lookup operations because multiple keys (MAC address and IP address) would be necessary to perform layer 3 processing. Consequently, the amount of address table space necessary to add layer 3 processing would be dramatically increased, substantially increasing the cost of the layer 3 switch.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal address table sizes to reduce size and cost of the network switch.

There is also a need for an arrangement that enables a switching module of a network switch to perform layer 3 processing using a shared table having both layer 2 and layer 3 address information and switching information.

These and other needs are attained by the present invention, where a network switch includes a switching module having a shared address table storing address entries for both layer 2 and layer 3 address search operations for layer 2 and layer 3 processing. The shared address table is configured for storing in each address entry two key entries, and two pointer fields, enabling each address entry of the shared address table to logically belong to two separate and independent tables for search purposes.

One aspect of the present invention provides a method in a network switch. The method includes receiving a first layer 2 frame at a network switch port, the first layer 2 frame including a layer 2 address and a layer 3 address. The method also includes searching for the layer 2 address in a table having a plurality of table entries, each table entry configured for storing layer 2 and layer 3 address information and a corresponding switching decision. The method also includes searching for the layer 3 address in the table.

The searching of the layer 2 and layer 3 addresses from the same table reduces the overall memory space required, since the same table can be used to share data for layer 2 and layer 3 switching operations. Hence, the same table can be used for multiple independent searches.

Another aspect of the present invention provides an integrated network switch configured for executing layer 3 switching decisions. The integrated network switch includes network switch ports, each configured for receiving a layer 2 frame including a Media Access Control (MAC) address and an Internet Protocol (IP) address. The integrated network switch also includes a switching module having a shared address table configured for storing in each table entry a MAC address field, an IP address field, and a switching information field for the corresponding MAC address field and IP address field. The switching module is configured for searching the shared address table using one of the MAC address and the IP address as search keys for the MAC address field and the IP address field, respectively. Use of the shared address table for both MAC address searching and IP address searching eliminates the necessity for duplicating switching information in separate address tables. Hence, each table entry within the shared address table can store all relevant information necessary for performing layer 2 or layer 3 switching for a given network node, for example MAC address, IP address, and switching information, minimizing the memory storage requirements for a layer 3 switching in an integrated network switch.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
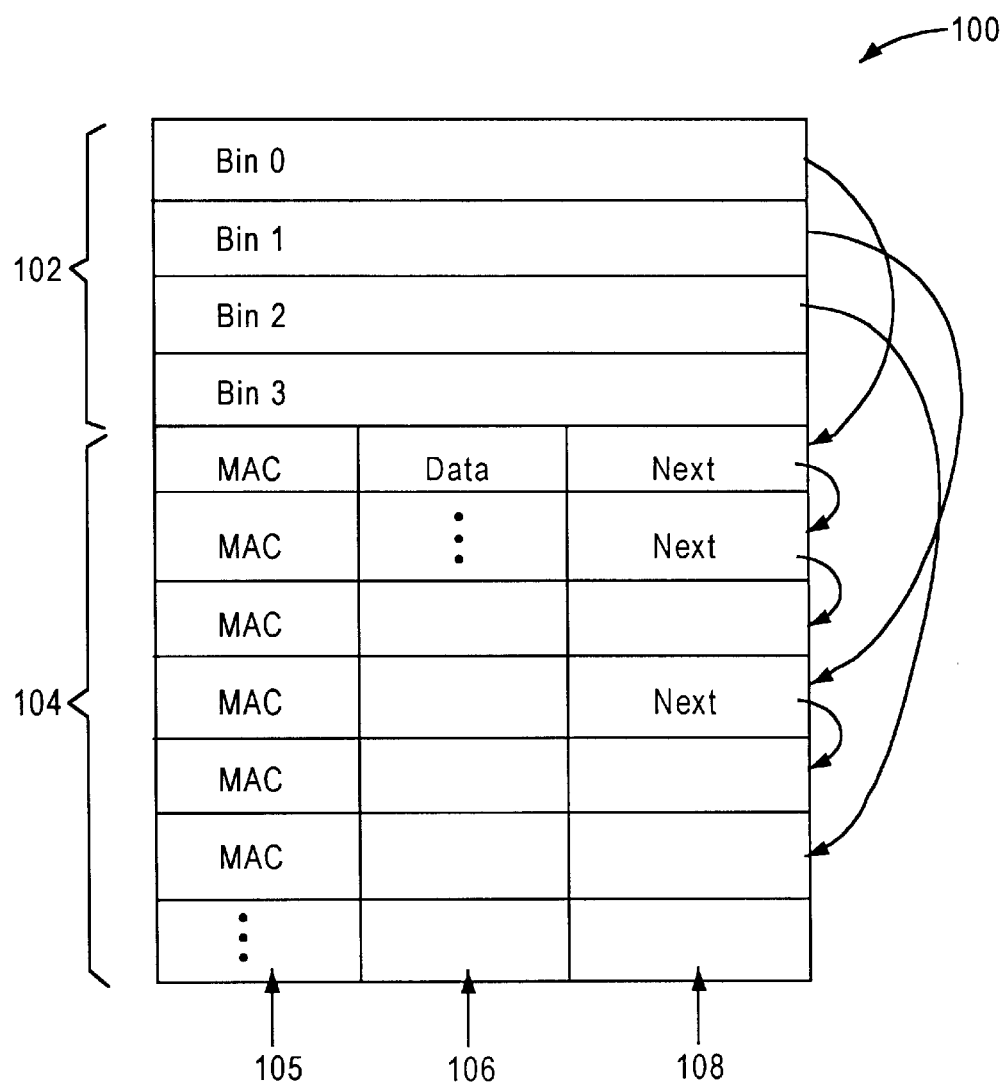
FIG. 1 is a diagram illustrating a conventional (prior art) address table for searching layer 2 addresses.
Figure 2:
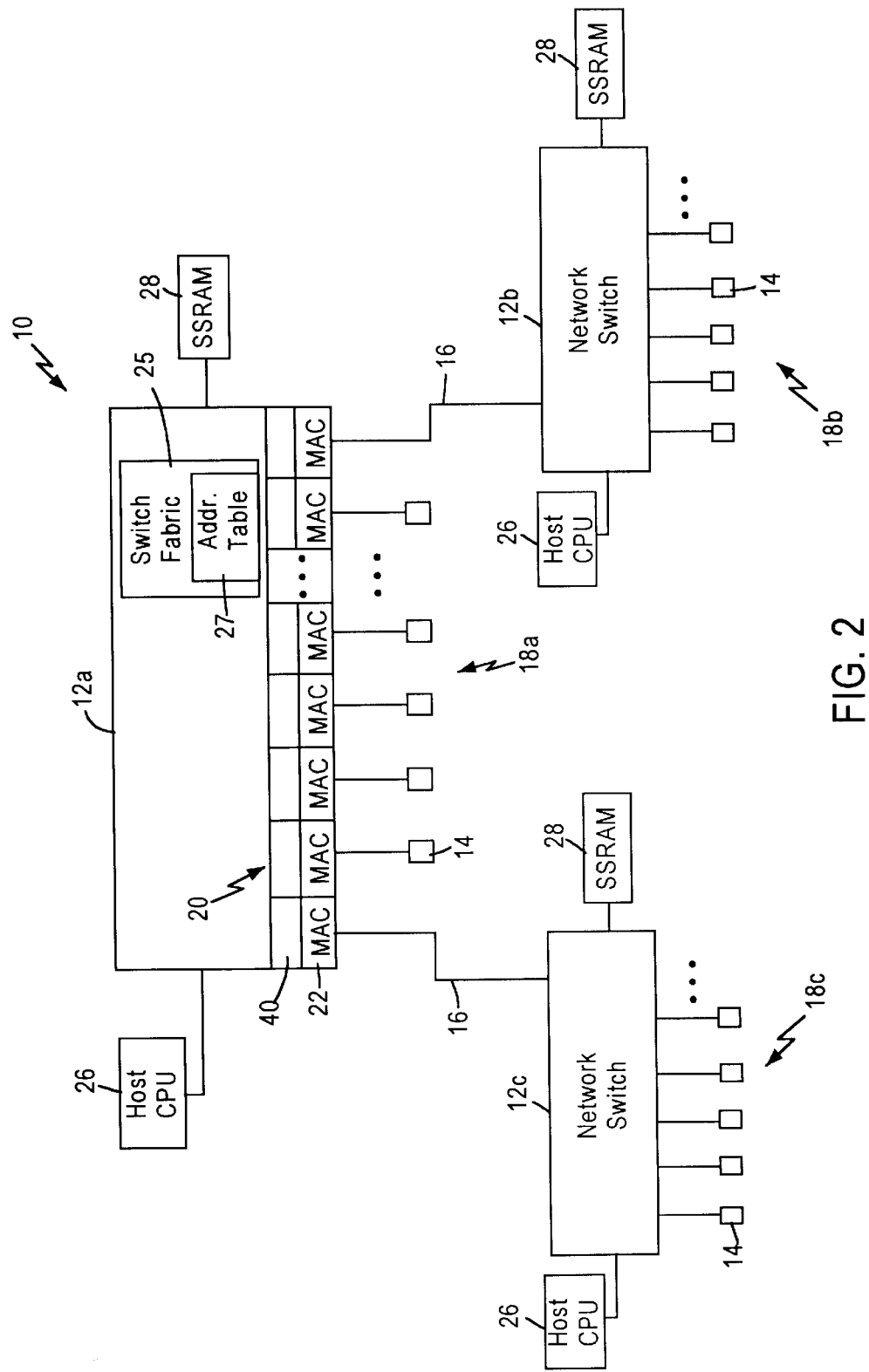
FIG. 2 is a block diagram of a packet switched network including multiple network switches for switching data packets between respective subnetworks according to an embodiment of the present invention.

FIG. 2 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol, and port filters 40. Each port filter 40 is configured for identifying relevant layer 2 and layer 3 information from a received layer 2 frame, and outputting the relevant layer 2 and layer 3 information to a switch fabric 25. The switch fabric 25 is configured for making frame forwarding decisions for received data packets. In particular, the switch fabric 25 includes a shared address table 27 configured for storing layer 2 and layer 3 information, and corresponding layer 2 switching decisions in each address entry, described below.

As shown in FIG. 2, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

According to the disclosed embodiment, the address table 27 is configured such that each table entry includes fields that enable both layer 2 and layer 3 processing to be performed from the same table entry. Hence, the shared address table 27 reduces the total memory requirements used by a hash table when searches by different keys are to be performed.

Figure 3:
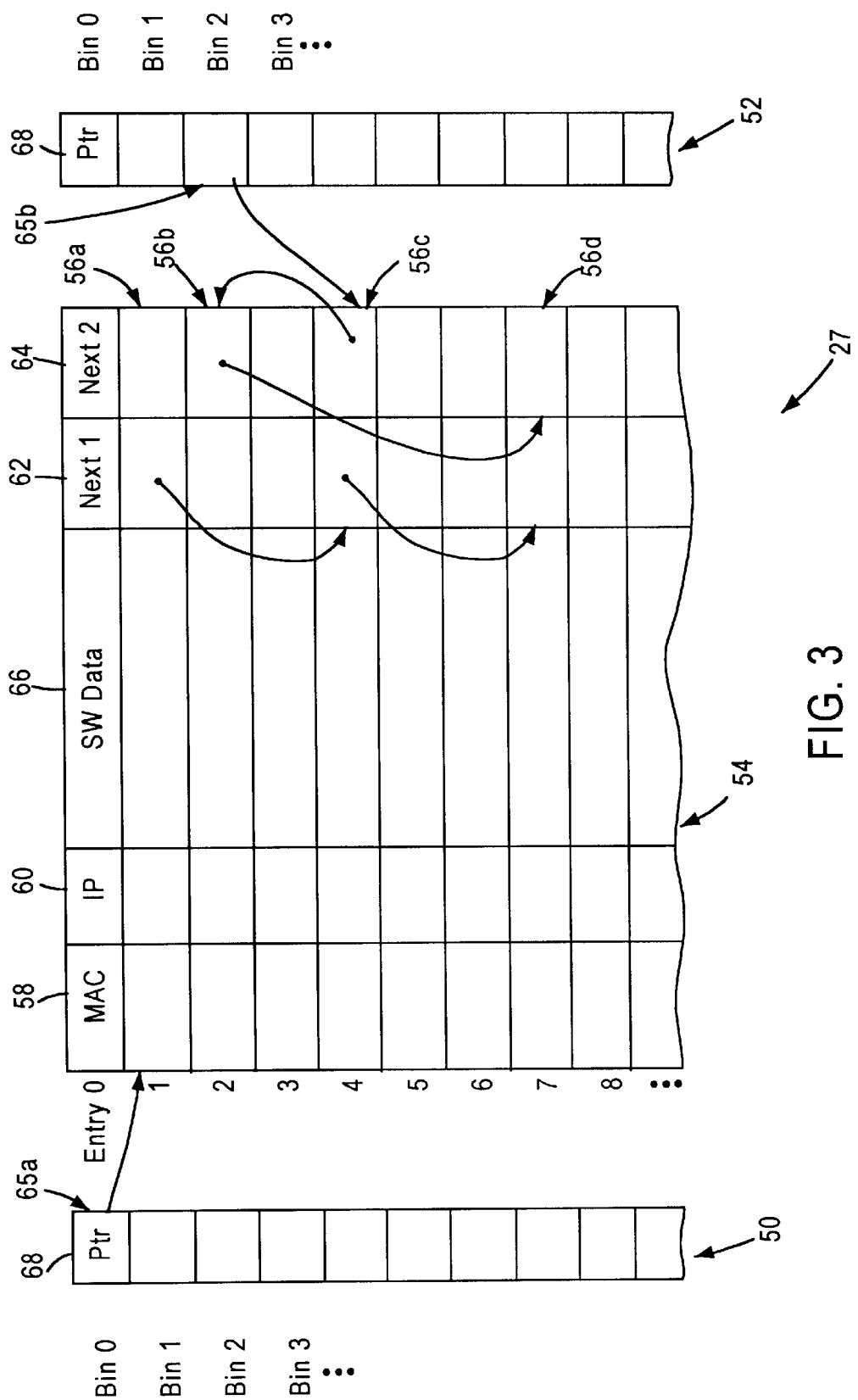
FIG. 3 is a diagram illustrating in detail the shared address table of FIG. 2 according to an embodiment of the present invention.

FIG. 3 is a diagram illustrating in detail the shared address table 27 according to an embodiment of the present invention. The shared address table 27 includes a first pointer segment 50, a second pointer segment 52, and a table entry portion 54. The table entry portion 54 includes a plurality of table entries 56, each including address information of a corresponding network node 14 that is used by the switch fabric 25 in making frame forwarding decisions. In particular, each table entry 56 includes a first key field 58, a second key field 60, a first linked list field 62, a second linked list field 64, and a data field 66. The first key field 58 and the second key field 60 are configured for storing the MAC address and the IP address of the corresponding network node 14, respectively. The data field 66 is configured for storing switching information, for example a port vector that identifies the output ports that should receive the layer 2 frame, depending on whether the corresponding MAC address and IP address are for a source address or a destination address; the switching information may also include information describing whether a data packet having a corresponding address should be treated as a priority packet, or whether the packet should be dropped.

The table entry portion 54 also includes a first linked list field 62 and a second linked list field 64, each configured for identifying another table entry 56 based on a bin entry 65 in a corresponding one of the first pointer memory segment 50 and the second pointer memory segment 52. In particular, the first pointer memory segment 50, also referred to as the first bin list, is an array of table entry pointers 68. In particular, the switch fabric 25 searches for a MAC address by generating a hash key for a received MAC address; the switch fabric 25 then identifies one of the bin entries 65 in the first bin list 50 by using the hash value as the index into the array. Once the switch fabric 25 identifies the matching bin entry 65 in the first bin list 50, the switch fabric 25 accesses the table entry 56 identified by the corresponding table entry pointer 68 to begin a linked list search using the MAC address field 58 as the search field and the received MAC address as the search key.

Figure 4:
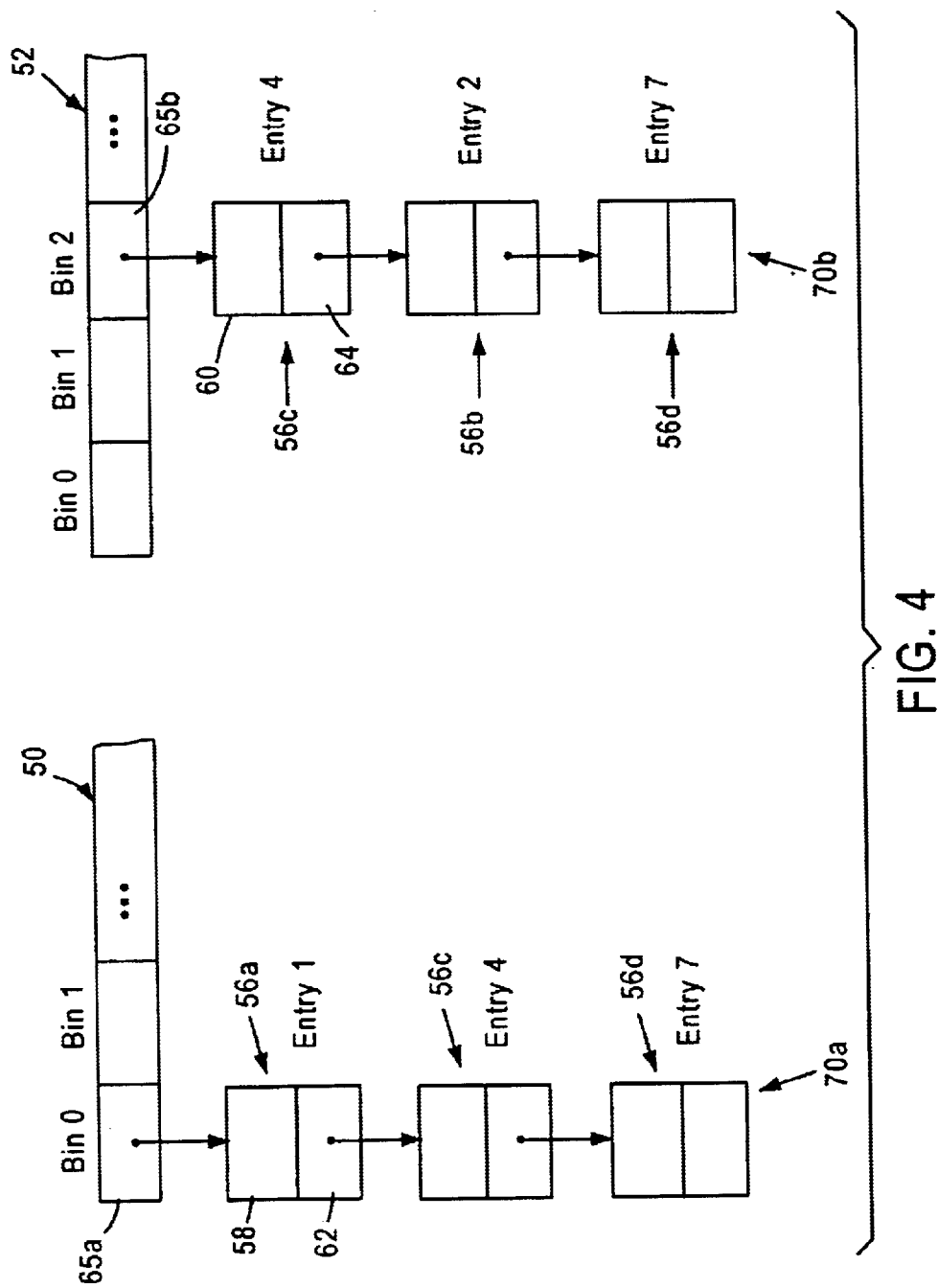
FIG. 4 is a diagram illustrating a logical linking of the table entries of FIG. 3 for independent searching of layer 2 and layer 3 addresses.

The first linked list field 62 and the second linked list field 64 in each table entry 56 include a first pointer (Next1) and a second pointer (Next2) for identifying another table entry 56 in the linked lists specified by the first key entry 58 and the second key entry 60, respectively. FIG. 4 is a diagram illustrating the logical linked lists for the MAC address searching and the IP address searching of the shared table 54 according to an embodiment of the present invention. The switch fabric 25 uses the first bin list 50, the first key entry 58, and the first linked list field 62 to search for MAC addresses in the shared table 54 according to the linked list 70a. Similarly, the switch fabric 25 uses the second bin list 52, the second key entry 60, and the second linked list field 64 to search for IP addresses in the shared table 54 according to the linked list 70b.

The switch fabric 25 uses the first linked list 70a for searching MAC addresses that have a hash key value corresponding to bin 65a; hence, the switch fabric 25, in response to accessing the table entry pointer within the bin entry 65a, accesses the first table entry 56a of the linked list 70a to determine if there is a match between the MAC address stored in the first key field 58 and the received MAC address. If there is no match, then the switch fabric 25 moves to the next table entry 56 specified in the first linked list field 62.

The switch fabric 25 performs the same type of search operation using the second linked list 70b for searching IP addresses. Specifically, the switch fabric 25 uses the second linked list 70b for searching IP addresses that have a hash key value corresponding to the hash key entry stored in bin 65b; hence, the switch fabric 25, in response to accessing the table entry pointer within the bin entry 65b, accesses the first table entry 56c of the linked list 70b to determine if there is a match between the IP address stored in the second key field 60 and the received IP address. If there is no match, then the switch fabric 25 moves to the next table entry 56 specified in the second linked list field 64.

Hence, the addition of a second key field 60 and a second linked list field 64 within the same memory 54 enables the addition of logical tables overlying on a single physical memory. Hence, any number of logical tables may be overlaid onto the same physical memory 54 by adding a key field 60 and a linked list field 64 for each corresponding bin list 52. The efficiency in storing multiple logical tables within the same physical memory can be substantial, especially if the data fields 66 between the different logical tables are nearly identical, such that the only additional memory space required is the addition of the extra key field and the corresponding linked list field.

According to the disclosed embodiment, multiple key fields are stored in a single table entry of an address table, enabling multiple searches using different keys on the same address table. Although the shared address table 54 does not allow simultaneous searches to be performed, this consideration is inconsequential in a network switch performing layer 3 processing, since a MAC address lookup and an IP address lookup for a given data packet can be performed sequentially without loss in switching performance.

Although the disclosed arrangement describes only two logical tables having respective key fields, it will be appreciated that any number of logical tables can be added to the shared memory merely by the addition of the appropriate number of key fields and linked list fields.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch, the method comprising:
    receiving a first layer 2 frame at a network switch port, the first layer 2 frame including a layer 2 address and a layer 3 address;
    first searching for the layer 2 address in a table having a plurality of table entries, each table entry configured for storing layer 2 and layer 3 address information and a corresponding switching decision,
    second searching for the layer 3 address of the first layer 2 frame in the table; and
    storing in each table entry the layer 2 address as a first search key, the layer 3 address as a second search key, a first linked list pointer configured for specifying a second table entry for searching the layer 2 address of the first layer 2 frame, and a second linked list pointer configured for specifying a third table entry for searching the layer 3 address of the first layer 2 frame.

2. The method of claim 1, wherein the second searching step includes comparing the second search key of said each table entry to the layer 3 address of the first layer 2 frame, and accessing the second linked list pointer for accessing the third table entry if the second search key of said each table entry does not match the layer 3 address of the first layer 2 frame.

3. The method of claim 2, wherein the second searching step includes selecting one of the table entries by:
    generating a hash key from the IP address of the first layer 2 frame;
    identifying a bin entry that corresponds to the generated hash key; and obtaining from the identified bin entry a pointer that identifies the selected one table entry.

4. The method of claim 3, wherein the first searching step includes selecting another one of the table entries by:

generating a second hash key from the MAC address of the first layer 2 frame;

identifying a second bin entry that corresponds to the second hash key; and obtaining from the identified second bin entry a second pointer that identifies the selected another one table entry.

5. The method of claim 1, wherein the first searching step includes selecting one of the table entries by:

generating a hash key from the MAC address of the first layer 2 frame;

identifying a first bin entry that corresponds to the hash key; and obtaining from the identified first bin entry a first pointer that identifies the selected one table entry.

6. The method of claim 5, wherein the second searching step includes selecting a second one of the table entries by:

generating a second hash key from the IP address of the first layer 2 frame;

identifying a second bin entry that corresponds to the second hash key; and obtaining from the identified second bin entry a second pointer that identifies the selected second one table entry.

7. The method of claim 6, wherein the step of selecting one of the table entries includes accessing a first portion of the table for a first bin list having a plurality of the first bin entries, each first bin entry having a layer 2 hash key representing a compressed layer 2 address and a first table entry pointer specifying a first one of the entries based on the corresponding layer 2 address information.

8. The method of claim 7, wherein the step of selecting a second one of the table entries includes accessing a second portion of the table for a second bin list having a plurality of the second bin entries, each second bin entry having a layer 3 hash key representing a compressed layer 3 address and a second table entry pointer specifying a second one of the entries based on the corresponding layer 3 address information.

9. An integrated network switch configured for executing layer 3 switching decisions, the integrated network switch including:

network switch ports, each configured for receiving a layer 2 frame including a Media Access Control (MAC) address and an Internet Protocol (IP) address; and a switching module having a shared address table having a plurality of table entries, the shared address table configured for storing in each said table entry a MAC address field, an IP address field, and a switching information field for the corresponding MAC address field and IP address field, the switching module configured for searching the shared address table using one of the MAC address and the IP address as a search key for a corresponding one of the MAC address field and the IP address field;

wherein the switching module is configured for generating a first hash key in response to the MAC address, the shared address table further including for each said table entry a first linked list field configured for storing a pointer identifying a second table entry having a MAC address corresponding to a matching hash key value;

wherein the switching module is configured for generating a second hash key in response to the IP address, the shared address table further including for each said table entry a second linked list field configured for storing a pointer identifying a second table entry having an IP address corresponding to a matching hash key value.

10. The switch of claim 9, further comprising a plurality of first bins, each configured for storing a pointer value that identifies one of the table entries having within the MAC address field a stored MAC address that corresponds to a first hash key value.

11. The switch of claim 10, further comprising a plurality of second bins, each configured for storing a second pointer value that identifies a second one of the table entries having within the IP address field a stored IP address that corresponds to a second hash key value.

* * * * *